(12) United States Patent
Zhang et al.

(10) Patent No.: US 12,342,411 B2
(45) Date of Patent: Jun. 24, 2025

(54) FAST CONNECTION RELEASE AFTER PAGING RESPONSE

(71) Applicant: QUALCOMM Incorporated, San Diego, CA (US)

(72) Inventors: Juan Zhang, Beijing (CN); Gavin Bernard Horn, La Jolla, CA (US); Ozcan Ozturk, San Diego, CA (US); John Wallace Nasielski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 17/756,430

(22) PCT Filed: Dec. 18, 2019

(86) PCT No.: PCT/CN2019/126166
§ 371 (c)(1),
(2) Date: May 25, 2022

(87) PCT Pub. No.: WO2021/120032
PCT Pub. Date: Jun. 24, 2021

(65) Prior Publication Data
US 2023/0007732 A1    Jan. 5, 2023

(51) Int. Cl.
*H04W 76/30* (2018.01)
*H04W 68/00* (2009.01)

(52) U.S. Cl.
CPC ......... *H04W 76/30* (2018.02); *H04W 68/005* (2013.01)

(58) Field of Classification Search
CPC ... H04W 76/30; H04W 68/005; H04W 88/06; H04W 68/12; H04W 68/00; H04W 76/15
See application file for complete search history.

(56) References Cited

U.S. PATENT DOCUMENTS

| 2010/0184448 | A1* | 7/2010 | Wu | H04W 76/10 455/450 |
| 2013/0208699 | A1* | 8/2013 | Hakkinen | H04W 76/38 370/331 |

(Continued)

FOREIGN PATENT DOCUMENTS

| CN | 103428674 A | 12/2013 |
| CN | 108141842 A | 6/2018 |

(Continued)

OTHER PUBLICATIONS

3GPP TS 38.331: "3rd Generation Partnership Project, Technical Specification Group Radio Access Network, NR, Radio Resource Control (RRC) Protocol Specification (Release 15)", 3rd Generation Partnership Project (3GPP), Mobile Competence Centre, 650, Route Des Lucioles, F-06921, Sophia-Antipolis Cedex, France, vol. RAN WG2, No. V15.7.0, Sep. 27, 2019, pp. 1-526, XP051785033, Whole Clauses 5.3.3 and 5.3.15.

(Continued)

*Primary Examiner* — Liem H. Nguyen
(74) *Attorney, Agent, or Firm* — Harrity & Harrity, LLP

(57) ABSTRACT

Various aspects of the present disclosure generally relate to wireless communication. In some aspects, a base station associated with a first radio access network (RAN) may transmit, and a user equipment (UE) may receive, a paging message while the UE is operating in an inactive or idle mode on the first RAN and while the UE is operating in a connected mode on a second RAN. The UE may transmit a response rejecting the paging message to the base station associated with the first RAN, and the response may include information that causes the base station to release the UE to the inactive or idle mode. Accordingly, the base station may transmit, to the UE, a radio resource control message that includes information to release the UE to the inactive or idle (Continued)

mode on the first RAN. Numerous other aspects are provided.

20 Claims, 9 Drawing Sheets

(56) References Cited

U.S. PATENT DOCUMENTS

| | | | |
|---|---|---|---|
| 2013/0267261 A1 | 10/2013 | Nikkelen | |
| 2015/0131454 A1* | 5/2015 | Wegmann | H04W 24/10 370/242 |
| 2017/0034723 A1 | 2/2017 | Anand et al. | |
| 2017/0064601 A1* | 3/2017 | Kubota | H04W 68/02 |
| 2018/0317200 A1 | 11/2018 | Kim et al. | |
| 2019/0239188 A1* | 8/2019 | Wang | H04W 68/005 |
| 2019/0268960 A1 | 8/2019 | Faccin et al. | |
| 2020/0120741 A1* | 4/2020 | Lindheimer | H04W 68/08 |
| 2020/0305118 A1* | 9/2020 | Ryu | H04W 76/10 |
| 2020/0396591 A1* | 12/2020 | Ou | H04W 76/30 |
| 2023/0413375 A1* | 12/2023 | Sha | H04W 72/23 |

FOREIGN PATENT DOCUMENTS

| | | | | |
|---|---|---|---|---|
| WO | WO-2014039853 A1 * | 3/2014 | | H04W 76/38 |
| WO | 2016140273 A1 | 9/2016 | | |

OTHER PUBLICATIONS

Sony: "Solution KI#1: Busy Indication as a Paging Response", SA WG2 Meeting #136, S2-1911141, 3rd Generation Partnership Project (3GPP), Mobile Competence Centre, 650, Route Des Lucioles, F-06921, Sophia-Antipolis Cedex, France, vol. SA WG2, No. Reno, US, Nov. 18, 2019-Nov. 22, 2019, Nov. 8, 2019, pp. 1-4, XP051821243, Background Section and Whole Clause 6.X.

Sony: "Solution KI#1: Busy Indication as a Paging Response", SA WG2 Meeting #136, S2-1912408, 3rd Generation Partnership Project (3GPP), Mobile Competence Centre, 650, Route Des Lucioles, F-06921, Sophia-Antipolis Cedex, France, vol. SA WG2, No. Reno, US, Nov. 18, 2019-Nov. 22, 2019, Nov. 21, 2019, pp. 1-5, XP051828377, Background Section, Proposal Section and Whole Clause 6.X.

Supplementary European Search Report—EP19956852—Search Authority—Munich—Aug. 11, 2023.

International Search Report and Written Opinion—PCT/CN2019/126166—ISAEPO—Sep. 22, 2020.

Sony: "Solution KI#1: Busy Indication as a Paging Response", SA WG2 Meeting #136, S2-1911141, 3rd Generation Partnership Project (3GPP), Mobile Competence Centre, 650, Route Des Lucioles, F-06921, Sophia-Antipolis Cedex, France, vol. SA WG2, No. Reno, US, Nov. 18, 2019-Nov. 22, 2019, Nov. 8, 2019, pp. 1-4.

* cited by examiner

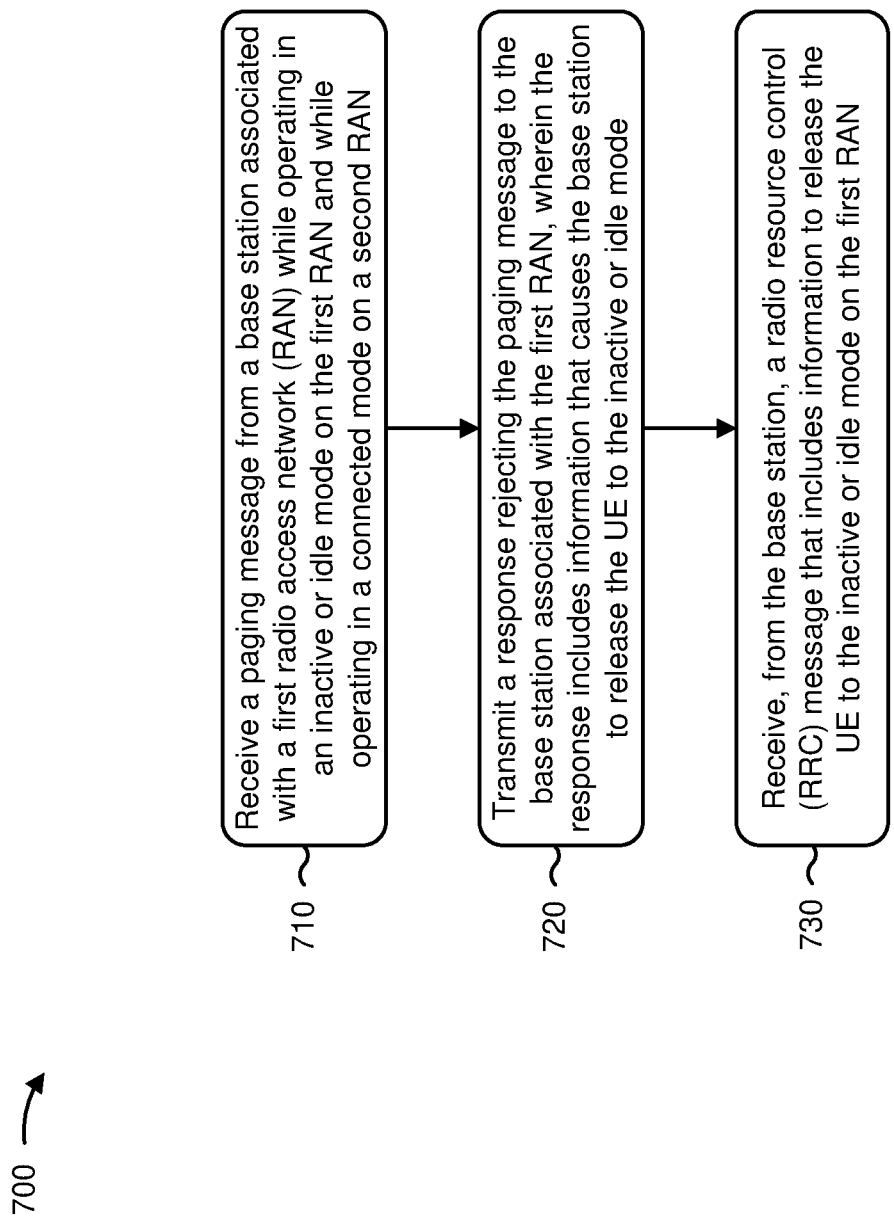

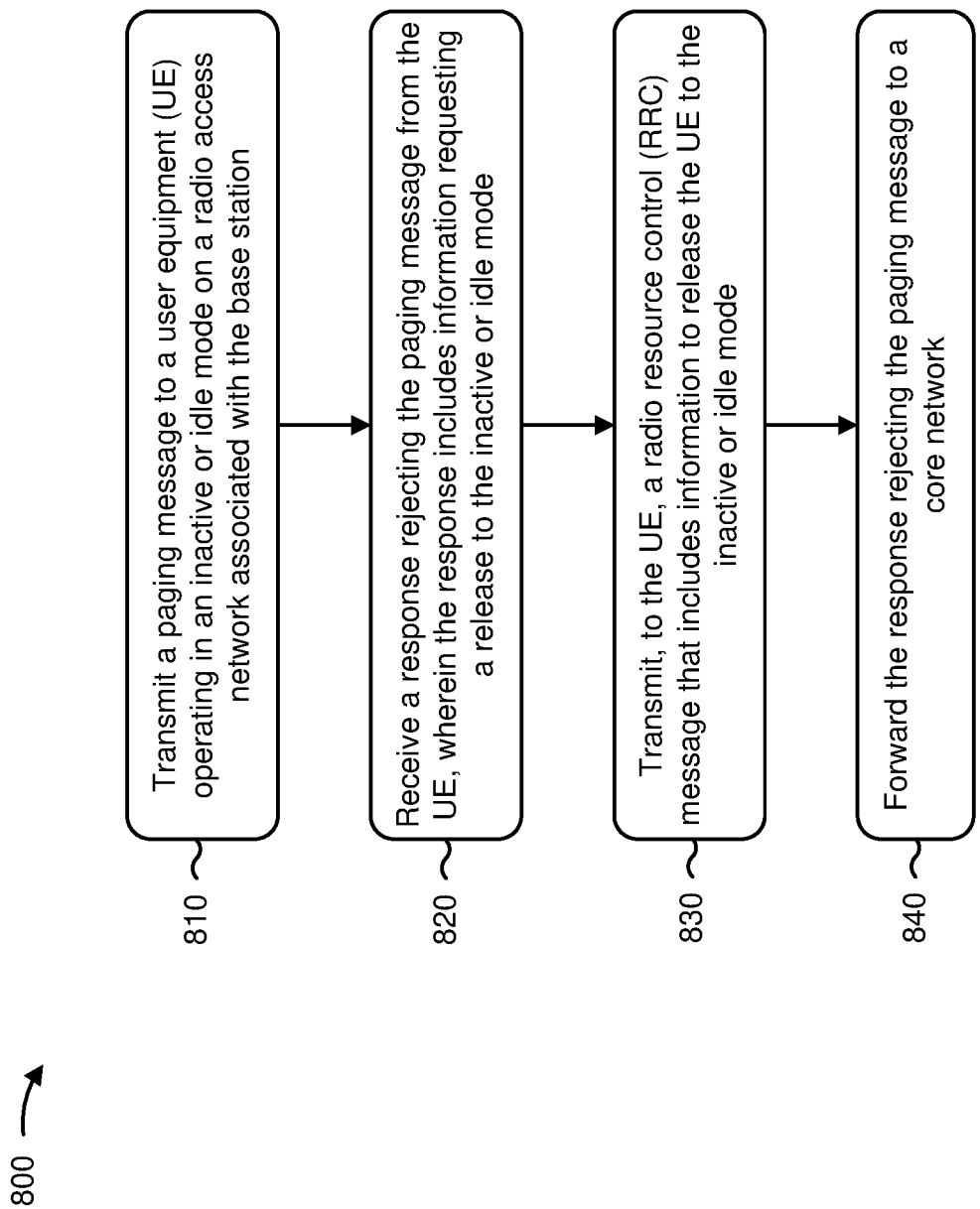

FAST CONNECTION RELEASE AFTER PAGING RESPONSE

CROSS-REFERENCE TO RELATED APPLICATION

This application is a 371 national stage of Patent Cooperation Treaty (PCT) Application No. PCT/CN2019/126166 filed on Dec. 18, 2019, entitled "FAST CONNECTION RELEASE AFTER PAGING RESPONSE," which is hereby expressly incorporated by reference herein.

FIELD OF THE DISCLOSURE

Aspects of the present disclosure generally relate to wireless communication and to techniques and apparatuses for fast connection release after a paging response.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include: receiving a paging message from a base station associated with a first radio access network (RAN) while operating in an inactive or idle mode on the first RAN and while operating in a connected mode on a second RAN; transmitting a response rejecting the paging message to the base station associated with the first RAN, wherein the response includes information that causes the base station to release the UE to the inactive or idle mode; and receiving, from the base station, a radio resource control (RRC) message that includes information to release the UE to the inactive or idle mode on the first RAN.

In some aspects, a method of wireless communication, performed by a base station, may include: transmitting a paging message to a UE operating in an inactive or idle mode on a RAN associated with the base station; receiving a response rejecting the paging message from the UE, wherein the response includes information requesting a release to the inactive or idle mode; transmitting, to the UE, an RRC message that includes information to release the UE to the inactive or idle mode; and forwarding the response rejecting the paging message to a core network.

In some aspects, a UE for wireless communication may include a memory and one or more processors operatively coupled to the memory. The memory and the one or more processors may be configured to: receive a paging message from a base station associated with a first RAN while operating in an inactive or idle mode on the first RAN and while operating in a connected mode on a second RAN; transmit a response rejecting the paging message to the base station associated with the first RAN, wherein the response includes information that causes the base station to release the UE to the inactive or idle mode; and receive, from the base station, an RRC message that includes information to release the UE to the inactive or idle mode on the first RAN.

In some aspects, a base station for wireless communication may include a memory and one or more processors operatively coupled to the memory. The memory and the one or more processors may be configured to: transmit a paging message to a UE operating in an inactive or idle mode on a RAN associated with the base station; receive a response rejecting the paging message from the UE, wherein the response includes information requesting a release to the inactive or idle mode; transmit, to the UE, an RRC message that includes information to release the UE to the inactive or idle mode; and forward the response rejecting the paging message to a core network.

In some aspects, a non-transitory computer-readable medium may store one or more instructions for wireless communication. The one or more instructions, when executed by one or more processors of a UE, may cause the one or more processors to: receive a paging message from a base station associated with a first RAN while operating in an inactive or idle mode on the first RAN and while operating in a connected mode on a second RAN; transmit a response rejecting the paging message to the base station associated with the first RAN, wherein the response includes information that causes the base station to release the UE to the inactive or idle mode; and receive, from the base station, an RRC message that includes information to release the UE to the inactive or idle mode on the first RAN.

In some aspects, a non-transitory computer-readable medium may store one or more instructions for wireless communication. The one or more instructions, when executed by one or more processors of a base station, may cause the one or more processors to: transmit a paging message to a UE operating in an inactive or idle mode on a RAN associated with the base station; receive a response rejecting the paging message from the UE, wherein the response includes information requesting a release to the inactive or idle mode; transmit, to the UE, an RRC message that includes information to release the UE to the inactive or idle mode; and forward the response rejecting the paging message to a core network.

In some aspects, an apparatus for wireless communication may include: means for receiving a paging message from a base station associated with a first RAN while operating in an inactive or idle mode on the first RAN and while operating in a connected mode on a second RAN; means for transmitting a response rejecting the paging message to the base station associated with the first RAN, wherein the response includes information that causes the base station to release the UE to the inactive or idle mode; and means for receiving, from the base station, an RRC message that includes information to release the UE to the inactive or idle mode on the first RAN.

In some aspects, an apparatus for wireless communication may include: means for transmitting a paging message to a UE operating in an inactive or idle mode on a RAN associated with the base station; means for receiving a response rejecting the paging message from the UE, wherein the response includes information requesting a release to the inactive or idle mode; means for transmitting, to the UE, an RRC message that includes information to release the UE to the inactive or idle mode; and means for forwarding the response rejecting the paging message to a core network.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a UE, in accordance with various aspects of the present disclosure.

FIG. 8 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
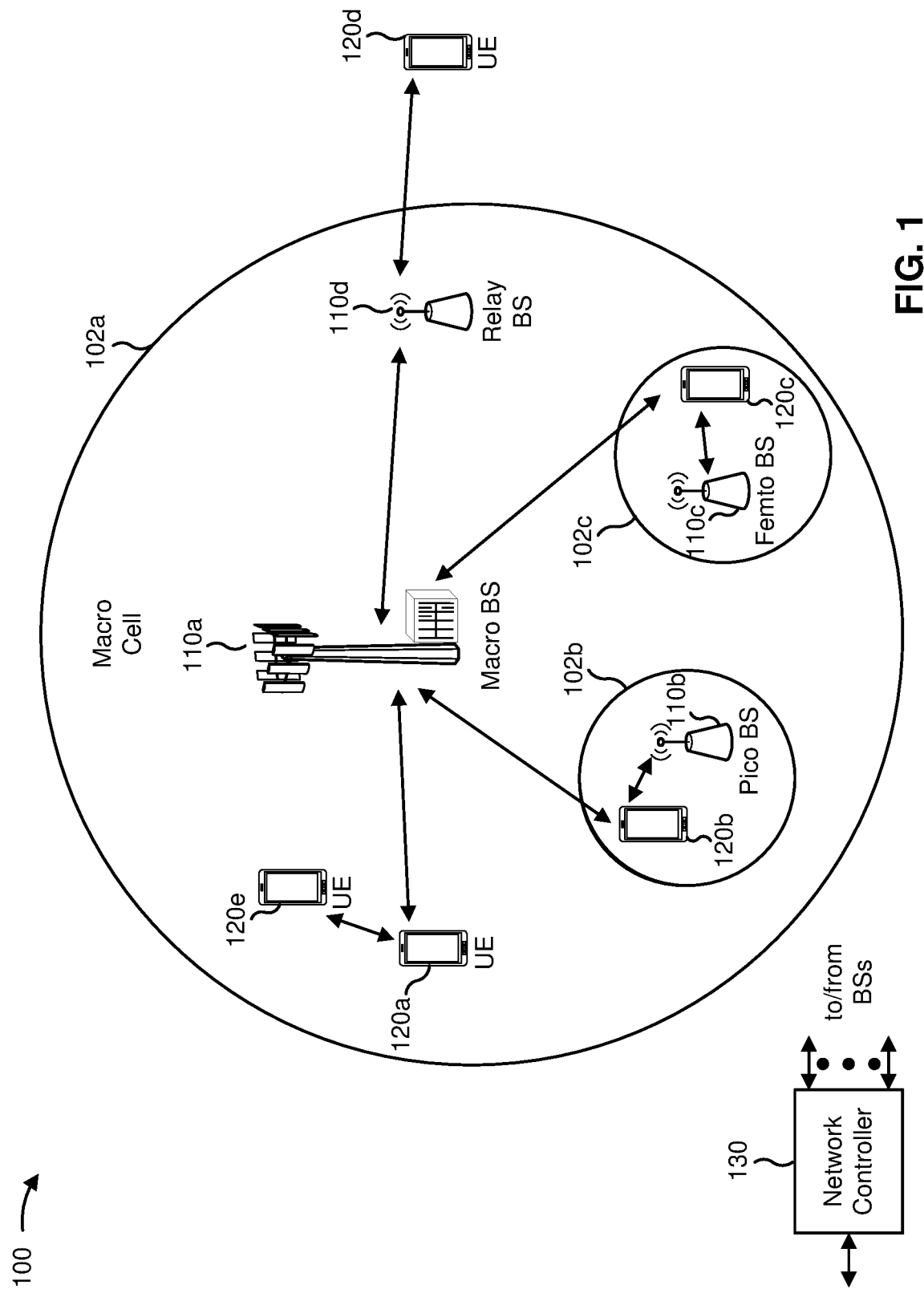
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
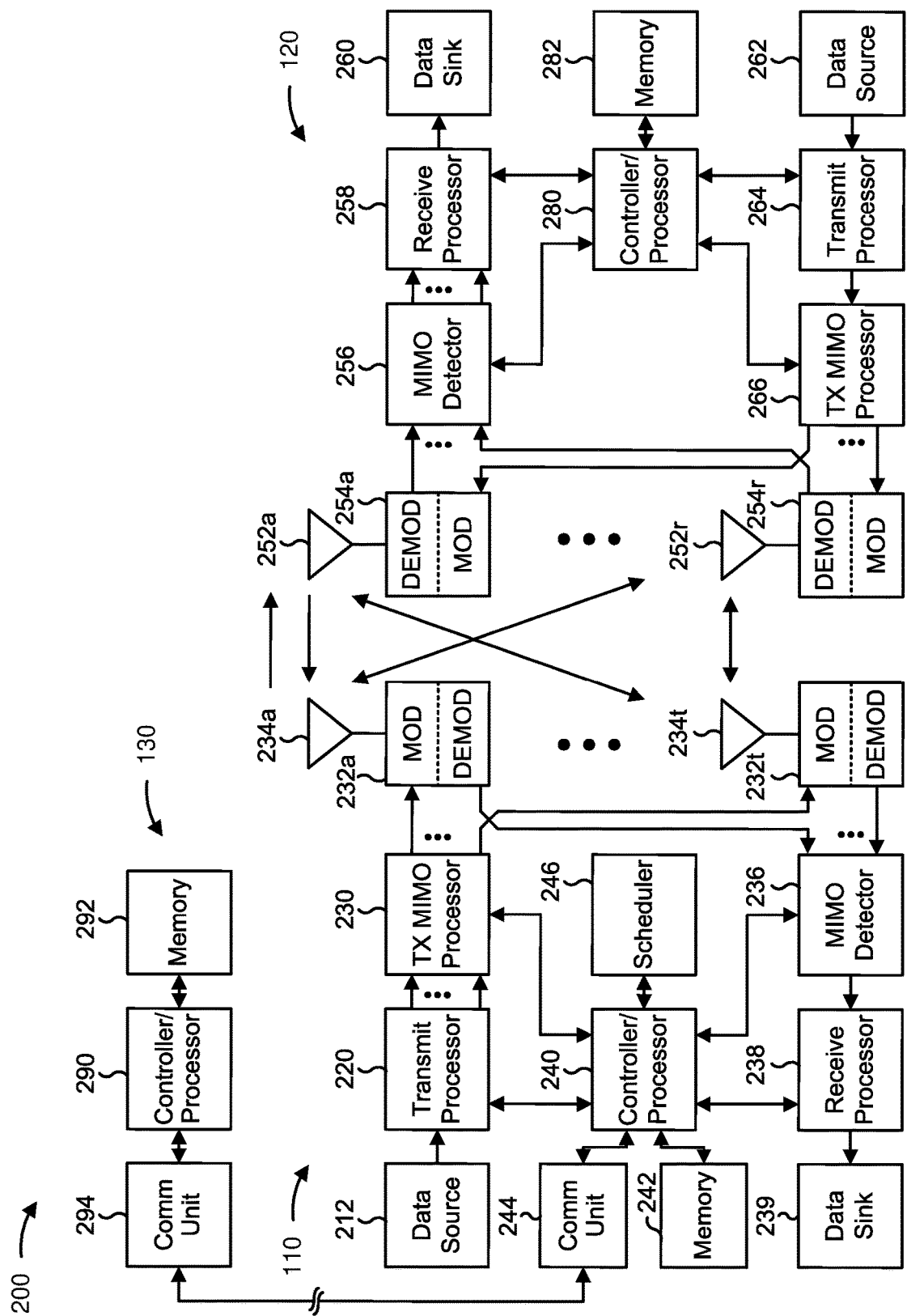
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a fast release after a paging response, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7, process 800 of FIG. 8, and/or other processes as described herein. A scheduler 246 may schedule UEs for data transmission on the downlink and/or uplink.

In some aspects, UE 120 may include means for receiving a paging message from base station 110 while operating in an inactive or idle mode on a first radio access network (RAN) associated with base station 110 and while operating in a connected mode on a second RAN, means for transmitting a response rejecting the paging message to base station 110, wherein the response includes information that causes base station 110 to release UE 120 to the inactive or idle mode, means for receiving, from base station 110, an RRC message that includes information to release UE 120 to the inactive or idle mode on the first RAN, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a paging message to UE 120 while UE 120 is operating in an inactive or idle mode on a RAN associated with base station 110, means for receiving a response rejecting the paging message from UE 120, wherein the response includes information requesting a release to the inactive or idle mode, means for transmitting, to UE 120, an RRC message that includes information to release UE 120 to the inactive or idle mode, means for forwarding the response rejecting the paging message to a core network, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
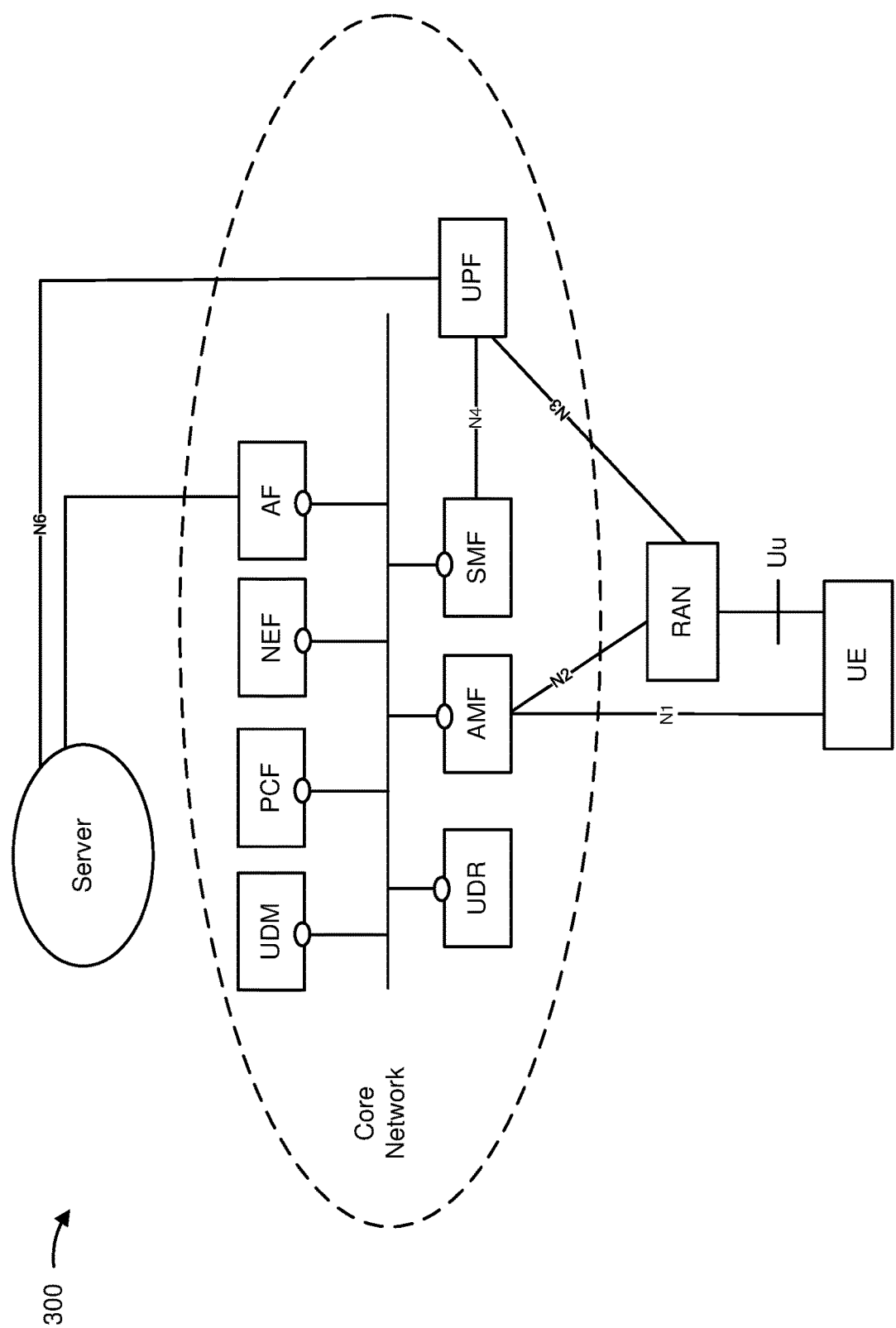
FIG. 3 is a diagram illustrating an example architecture of a wireless communication network, in accordance with various aspects of the present disclosure.

FIG. 3 is a diagram illustrating an example architecture 300 of a wireless communication network, in accordance with various aspects of the present disclosure.

In some aspects, the architecture 300 may include a radio access network (RAN), such as a next generation RAN (NG-RAN), which may include one or more base stations, such as base station 110, that communicate with a UE, such as UE 120, over a Uu interface. The Uu interface is a radio interface between the UE and the RAN. The architecture 300 may further include a core network that provides communications between the RAN and a data network, which may include one or more devices that may act as a server, such as a mobile network operator server, a cloud server, a third-party server, a server that may provide data and/or services to the UE through applications on the UE, and/or the like. For example, the core network may provide communications between the RAN and the data network via wired and/or wireless connections with an application function (AF) entity, a user plane function (UPF) entity, and/or the like.

In some aspects, the core network may include a unified data management (UDM) entity that makes relevant data available to an access and mobility management function (AMF) entity and a session management function (SMF) entity. For example, the UDM entity may store subscriber data and profiles in the wireless communication network. The UDM entity may be used for fixed access, mobile access, and/or the like, in the core network. The AMF entity manages UE network registration, manages mobility, maintains a non-access stratum (NAS) signaling connection with the UE, and manages a registration procedure of the UE with a network. The SMF entity manages sessions, allocates IP addresses to the UE, and supports establishing, modifying, and/or releasing communications sessions in the wireless communication network.

In some aspects, the UPF entity manages user traffic to and from the UE through the RAN and enforces a quality of service (QoS). The UPF entity may serve as an anchor point for intra/inter radio access technology (RAT) mobility. The UPF entity may apply rules to packets, such as rules pertaining to packet routing, traffic reporting, handling user plane QoS, and/or the like. The UPF entity may determine an attribute of application-specific data that is communicated in a communications session. The UPF entity may receive information (e.g., information related to communications with a UE) from one or more RAN nodes (e.g., via an N4 interface with the SMF entity, an application program interface (API), and/or the like). Furthermore, the UPF entity may have an N3 interface that can be used to transfer downlink and uplink user plane traffic to and from the one or more RAN nodes (e.g., the UPF entity may receive downlink user plane traffic destined for a UE from the server in the data network and transfer the downlink user plane traffic to one or more RAN nodes serving the UE, receive uplink user traffic from the one or more RAN nodes serving the UE, and/or the like.

In some aspects, the core network further includes a policy and control function (PCF) entity that implements charging rules, implements flow control rules, manages traffic priority, manages a QoS for user subscription services, and provides a policy framework that incorporates network slicing, roaming, packet processing, mobility management, and/or the like. In some aspects, the core network may further include a unified data repository (UDR) entity that stores structured data for exposure to network functions, and a network exposure function (NEF) entity that securely exposes services, capabilities, and/or events in the wireless communication network to help other entities in the wireless communication network discover network services and/or utilize network resources efficiently. In some aspects, the AF entity supports application functionality, influences traffic routing, and interacts with the PCF entity. For example, the AF entity may determine whether a UE provides preferences for a set of network slice policies and support application influence on traffic routing, access to the NEF entity, policy control, and/or the like.

In some aspects, while Long Term Evolution (LTE) uses evolved packet system (EPS) bearers that are each assigned an EPS bearer identifier (ID), New Radio (NR) uses QoS flows, each identified by a QoS flow ID (QFI). The QoS flow is where policy and charging are enforced. All traffic within the same QoS flow may receive the same treatment. In the core network, a single user plane network function (the UPF entity) is used to transport data between a base station (e.g., a gNB) associated with the RAN and the core network. Each QoS flow on an N3 interface may be mapped to a single general packet radio service (GPRS) tunneling protocol (GTP) tunnel for the user plane (GTP-U). The base station may map individual QoS flows to one more dedicated radio bearers (DRBs), multicast radio bearers (MRBs), and/or the like. A protocol data unit (PDU) session may contain multiple QoS flows and several DRBs, but only a single N3 GTP-U tunnel. A DRB, an MRB, and/or the like may transport one or more QoS flows. In sum, these entities permit user data traffic or other types of information to be transmitted on a user plane.

As indicated above, FIG. 3 is provided as an example. Other examples may differ from what is described with regard to FIG. 3.

Figure 4:
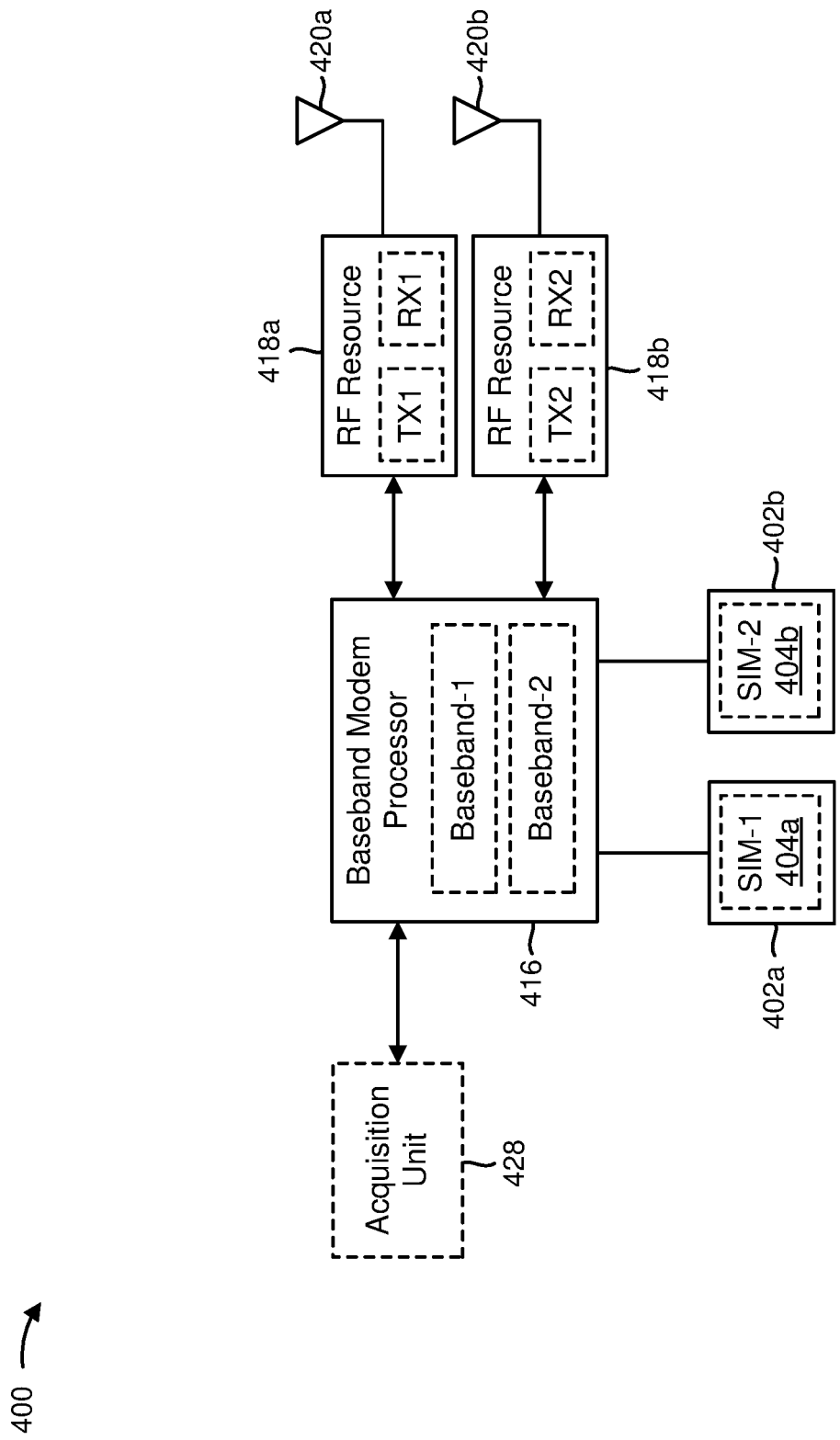
FIG. 4 is a diagram illustrating an example radio and baseband architecture in a UE having multiple subscriber identity modules (SIMs), in accordance with various aspects of the present disclosure.

FIG. 4 is a diagram illustrating an example radio and baseband architecture in a UE having multiple subscriber identity modules (SIMs), in accordance with various aspects of the present disclosure. In some aspects, the radio and baseband architecture 400 shown in FIG. 4 may represent one possible configuration for the UE 120 shown in FIGS. 1-3 and/or described in further detail above.

In some aspects, as shown in FIG. 4, a first SIM interface 402a may receive a first SIM (SIM-1) 404a associated with a first subscription, and a second SIM interface 402b may receive a second SIM (SIM-2) 404b associated with a second subscription. In some aspects, the first subscription and the second subscription may be for different wireless networks or for the same wireless network.

As used herein, the terms "SIM," "SIM card," "subscriber identity module," "universal SIM," "USIM," and variants thereof may be used interchangeably to refer to a memory that may be an integrated circuit or embedded into a removable card, soldered into a device, and/or the like, and that stores an International Mobile Subscriber Identity (IMSI), a related key, and/or other information used to identify and/or authenticate a UE on a wireless network and enable a communication service with the wireless network. Because the information stored in a SIM enables the UE to establish a communication link for a particular communication service with a particular network, the term "SIM" may also be used herein as a shorthand reference to the communication service associated with and enabled by the information stored in a particular SIM, as the SIM and the communication network (as well as the services and subscriptions supported by that network) generally correlate to one another.

In some aspects, the first SIM 404a and/or the second SIM 404b may be a Universal Integrated Circuit Card (UICC) configured with SIM and/or universal SIM (USIM) applications, enabling access to GSM and/or UMTS networks. The UICC may also provide storage for a phone book and/or other suitable applications. Additionally, or alternatively, a SIM may be an embedded UICC (eUICC) or embedded SIM (eSIM), a universal SIM (USIM), a removable user identity module (R-UIM), and/or the like. The first SIM 404a and/or the second SIM 404b may have a CPU, ROM, RAM, EEPROM and I/O circuits. An Integrated Circuit Card Identity (ICCID) SIM serial number may be printed on the SIM card for identification. However, a SIM may be implemented in a portion of memory of the UE, and thus need not be a separate or removable circuit, chip, or card. A SIM used in various aspects may store user account information, an IMSI, a set of SIM application toolkit (SAT) commands, and other network provisioning information, as well as provide storage space for a phone book database that contains user contacts. As part of the network provisioning information, a SIM may store home identifiers (e.g., a System Identification Number (SID)/Network Identification Number (NID) pair, a Home Public Land Mobile Network (HPLMN) code, and/or the like) to indicate the SIM card network operator provider.

In some aspects, each SIM (e.g., the first SIM 404a and the second SIM 404b) may be associated with a baseband-RF resource chain, which may include a baseband modem processor 416 that may perform baseband/modem functions for communications on at least one SIM. Furthermore, in some aspects, the baseband-RF resource chain may include one or more amplifiers and radios, referred to generally herein as RF resources 418a, 418b (e.g., a first RF resource 418a and a second RF resource 418b). In some aspects, baseband-RF resource chains may share the baseband modem processor 416 (e.g., where the baseband modem processor 416 performs baseband/modem functions for all SIMs on the UE). Additionally, or alternatively, each baseband-RF resource chain may include physically or logically separate baseband processors (e.g., baseband-1, baseband-2, and/or the like).

In some aspects, the RF resources 418a, 418b may include circuitry that can perform transmit and receive functions for the associated SIMs 404a, 404b. For example, in some aspects, the RF resources 418a, 418b may include separate transmit and receive circuitry, or may include a transceiver that combines transmitter and receiver functions. The RF resources 418a, 418b may each be coupled to a wireless antenna (e.g., a first wireless antenna 420a or a second wireless antenna 420b). The RF resources 418a, 418b may also be coupled to the baseband modem processor 416. For simplicity, the first RF resource 418a (as well as the associated components) may be associated with the first subscription as enabled by the first SIM 404a. For example, the first RF resource 418a may be configured to transmit and receive data via a first wireless connection. The second RF resource 418b may be associated with the second subscription as enabled by the second SIM 404b. For example, the second RF resource 418b may be configured to transmit and receive data via a second wireless connection.

In some aspects, the radio and baseband architecture 400 may include an acquisition unit 428 configured to manage and/or schedule utilization of the RF resources 418a, 418b for acquisition processes. For example, the acquisition unit 428 can be configured to perform acquisition processes for the first subscription and the second subscription. In some aspects, the acquisition unit 428 may include (or couple to) at least one of a radio resource control (RRC) layer, a radio resource management (RRM) layer, a radio link control (RLC) layer, a medium access control (MAC) layer, a physical layer, and/or the like.

Hardware and/or software for one or more functions described herein may be incorporated in the radio and baseband architecture 400 during manufacturing, for example, as part of the original equipment manufacturer (OEM) configuration of a UE implementing the radio and baseband architecture 400. In some aspects, such hardware and/or software may be added to the radio and baseband architecture 400 post-manufacture, such as by installing one or more software applications onto the UE implementing the radio and baseband architecture 400. In some aspects, a UE implementing the radio and baseband architecture 400 shown in FIG. 4 may include additional SIM cards, SIM interfaces, RF resources associated with the additional SIM cards, and additional antennas for connecting to additional mobile networks.

As indicated above, FIG. 4 is provided as an example. Other examples may differ from what is described with regard to FIG. 4.

Figure 5:
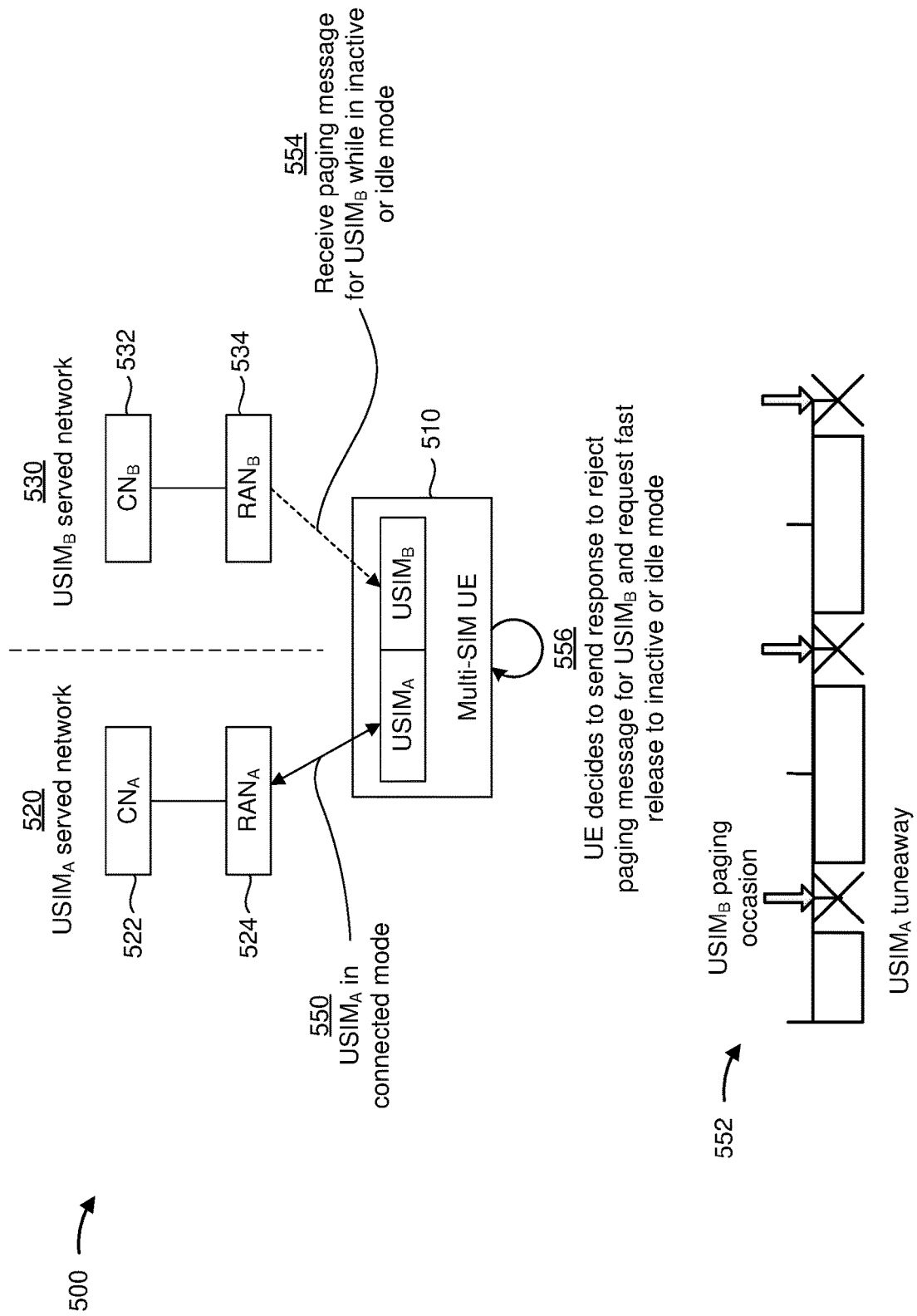
FIG. 5 is a diagram illustrating an example of a multi-SIM UE requesting a fast release after responding to a paging message, in accordance with various aspects of the present disclosure.

FIG. 5 is a diagram illustrating an example 500 of a multi-SIM UE 510 requesting a fast release after responding to a paging message, in accordance with various aspects of the present disclosure. In general, as shown in FIG. 5, the multi-SIM UE 510 may include multiple USIMs (USIMA and USIMB) that may share common radio and baseband components (e.g., baseband modem processor 416, RF resources 418, wireless antenna 420, and/or the like). Accordingly, the multi-SIM UE 510 shown in FIG. 5 may represent an example of a multi-SIM-multi-standby (MSMS) communication device. For example, the multi-SIM UE may be a dual-SIM-dual-standby (DSDS) communication device with two SIM cards and two corresponding subscriptions that may both be active on standby (e.g., while in an RRC idle or inactive mode), but one is deactivated when the other one is in use (e.g., while the other is in an RRC connected mode). In another example, the multi-SIM UE 510 may be a triple-SIM-triple-standby (TSTS) communication device, which includes three SIM cards and corresponding subscriptions that may all be active on standby, but two are deactivated when the third one is in use. In other examples, the multi-SIM UE 510 may have other suitable multi-SIM configurations, with, for example, four or more SIMs, such that when one is in use, the others are all deactivated. In other words, because the multiple SIMs share common radio and baseband components, only one can operate in an active mode (e.g., RRC connected mode) at a particular point in time.

In some aspects, each USIM may be associated with a subscription to acquire wireless network service from a base station associated with a given cell. For example, as shown in FIG. 5, USIMA may be served by a first wireless network 520 (USIMA served network) that includes a core network 522 (CNA) and a radio access network (RANA) 524 that includes one or more RAN nodes (e.g., base stations, eNBs, gNBs, TRPs, and/or the like) that may broadcast the first wireless network 520 in a first serving cell. As further shown in FIG. 5, USIMB may be served by a second wireless network 530 (USIMB served network) that includes a core network 532 (CNB) and a RAN 534 (RANG) that includes one or more RAN nodes that may broadcast the second wireless network 530 in a second serving cell. The multi-SIM UE 510 may acquire wireless service from either the first serving cell or the second serving cell.

For example, as shown in FIG. 5, and by reference number 550, the multi-SIM UE 510 may be actively communicating with the core network 522 in the first wireless network 520 in a connected mode (e.g., RRC connected mode) through a first wireless connection to a RAN node (e.g., a base station) in the RAN 524 associated with the first wireless network 520, which may correspond to a first subscription associated with USIMA. Furthermore, in some aspects, the multi-SIM UE 510 may be camped on the second wireless network 530 (e.g., in an RRC idle mode, inactive mode, and/or the like) through a second wireless connection to a RAN node in the RAN 534 associated with the second wireless network 530, which may correspond to a second subscription associated with USIMB. In some aspects, the RAN nodes in the first and second wireless networks 520, 530 may be in communication with one or more nodes in the corresponding core networks 522, 532 over wired and/or wireless connections (e.g. via an N2 interface with an AMF entity, an N3 interface with a UPF entity, and/or the like).

As further shown in FIG. 5, and by reference number 552, the multi-SIM UE 510 may periodically tune away from receiving downlink data from the first wireless network 520 associated with USIMA in order to monitor a paging occasion associated with USIMB. Accordingly, in some cases, as shown by reference number 554, the multi-SIM UE 510 may receive a paging message related to the second subscription associated with USIMB from a RAN node in the second wireless network 530 serving USIMB while USIMA is operating in the connected mode and while USIMB is operating in an idle or inactive mode. In some cases, the multi-SIM UE 510 may decide to not enter the connected mode on the second wireless network 530 (e.g., because the multi-SIM UE 510 is engaged in a high-priority service, such as a voice call, on the first wireless network 520, the paging message relates to a low-priority service, based at least in part on one or more policies, and/or the like). However, if the multi-SIM UE 510 does not send a response to the paging message or otherwise provide feedback related to the paging message to the second wireless network 530, the second wireless network 530 may continue to send additional paging repetitions to the multi-SIM UE 510 (e.g., the lack of a response or feedback to the paging message may indicate that the multi-SIM UE 510 did not receive the paging message). This may waste resources of one or more devices in the core network 532 that initiate the additional paging repetitions, one or more devices in the RAN 534 that send the additional paging repetitions to the multi-SIM UE 510, the multi-SIM UE 510 that receives and decodes the additional paging repetitions, and/or the like.

Accordingly, some aspects described herein provide techniques and apparatuses to enable a multi-SIM UE, such as the multi-SIM UE 510 shown in FIG. 5, to initiate a procedure to enter into a connected mode on the second wireless network 530 in order to provide a response to reject a paging message, thereby providing feedback to ensure that the second wireless network 530 will not send additional paging repetitions. Furthermore, the multi-SIM UE may include, in the response to the paging message, information to request a fast release to inactive or idle mode. For example, as described above, the multi-SIM UE 510 may be an MSMS (e.g., DSDS, TSTS, and/or the like) communication device with multiple SIMs (e.g., USIMA and USIMB) that share common radio and baseband components. Accordingly, if the multi-SIM UE 510 enters connected mode on the second wireless network 530 that serves USIMB in order to send the response rejecting the paging message, a radio connection to the first wireless network 520 that serves USIMA will be released. This may interrupt data transmission related to the first subscription associated with USIMA because the multi-SIM UE 510 has a single Tx/Rx chain shared among USIMA and USIMB. Accordingly, as shown by reference number 556, the UE may decide to send a response to reject the paging message for USIMB and include, in the response, information to request a fast release to inactive or idle mode. In this way, interruption to communications related to the first subscription associated with USIMA may be reduced or avoided.

As indicated above, FIG. 5 is provided as an example. Other examples may differ from what is described with regard to FIG. 5.

Figure 6A:
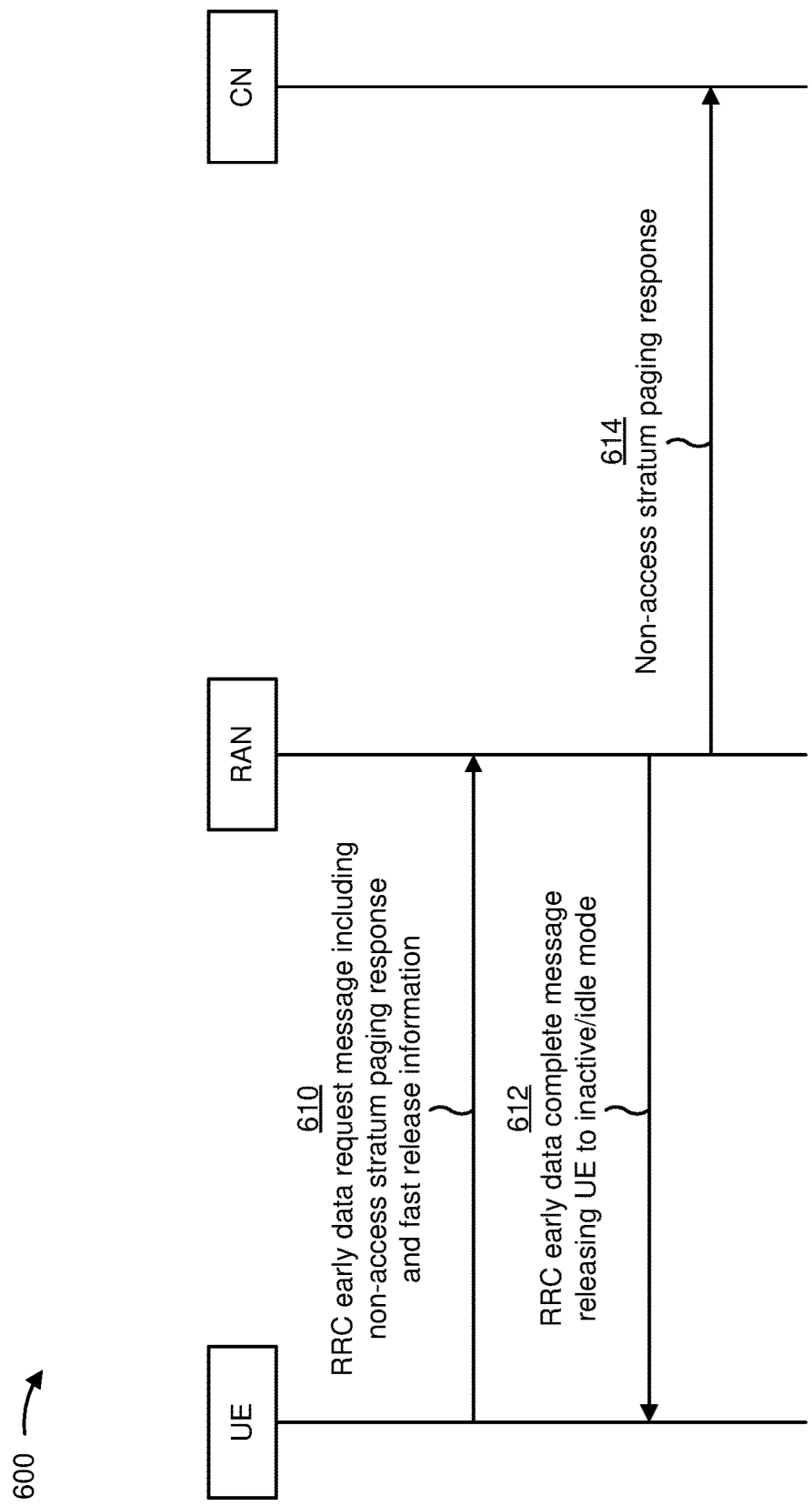
FIGS. 6A-6B are diagrams illustrating one or more examples of a fast release after a paging response, in accordance with various aspects of the present disclosure.
Figure 6B:
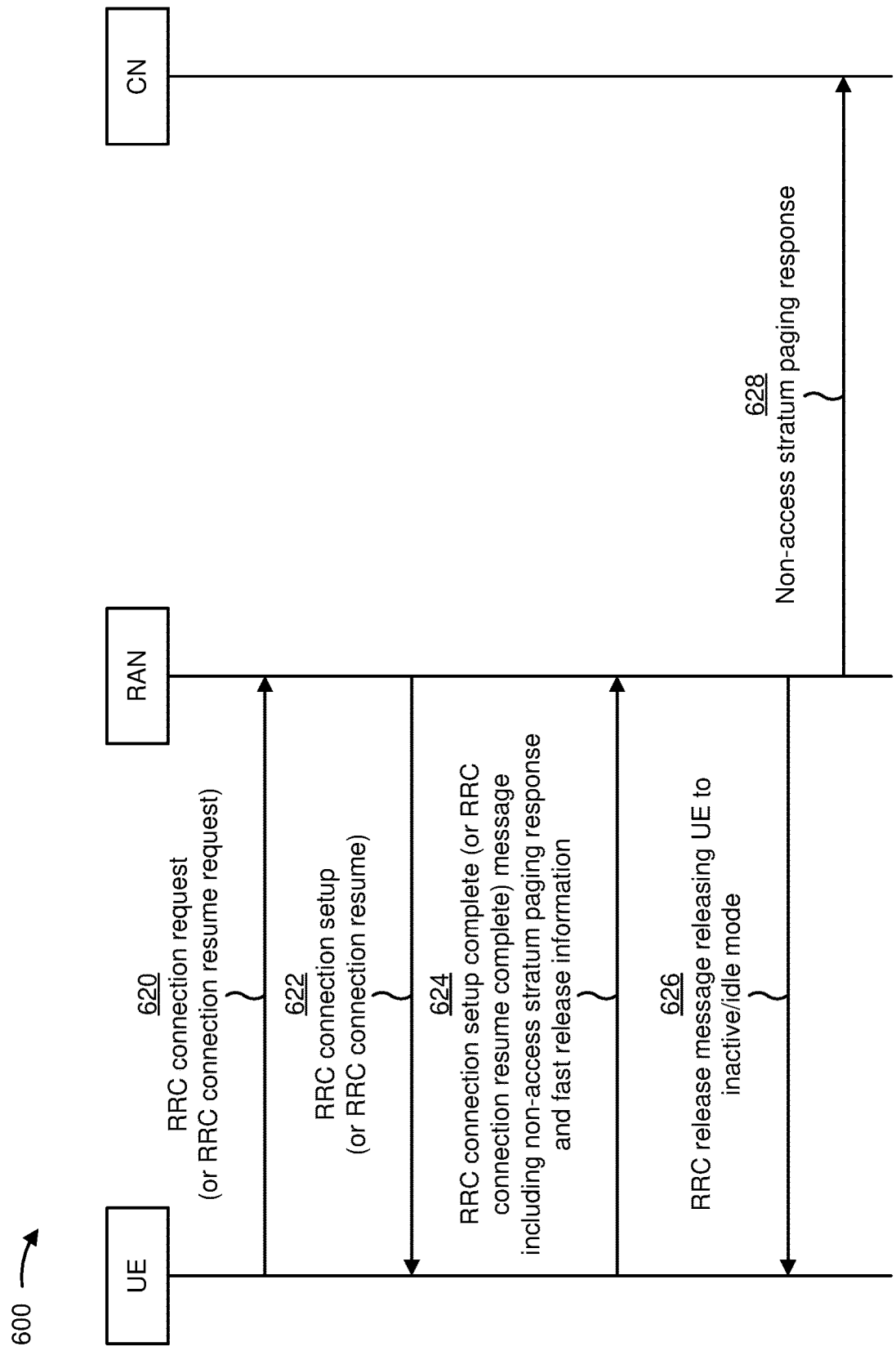

FIGS. 6A-6B are diagrams illustrating one or more examples of a fast release after a paging response, in accordance with various aspects of the present disclosure. As shown in FIGS. 6A-6B, example(s) 600 include a multi-SIM UE (referred to hereinafter as "UE" for simplicity), a RAN, and a core network. In some aspects, the UE may be operating in an inactive or idle mode on a first wireless network that includes the RAN and the core network using a first subscription associated with a first SIM, and may be simultaneously operating in a connected mode on a second wireless network using a second subscription associated with a second SIM. In some aspects, the UE may receive, from a base station in the RAN, a paging message that initiates from the core network while the UE is operating in the inactive or idle mode on the first wireless network that includes the RAN and the core network and while operating in the connected mode on a second wireless network. Accordingly, FIGS. 6A-6B illustrate different techniques that the UE may employ to transmit a response rejecting the paging message in order to avoid additional paging repetitions from the first wireless network and include fast release information with the response to the paging message in order to minimize disruption to connected mode operations on the second wireless network.

For example, as shown in FIG. 6A, and by reference number 610, the UE may transmit, and a base station in the RAN may receive, an RRC early data request message that includes a non-access stratum (NAS) paging response and fast release information. In some aspects, the NAS paging response may include information to indicate that the UE is rejecting the paging message (e.g., does not want to enter connected mode on the first wireless network). In this way, the UE may acknowledge that the paging message was received and indicate that additional paging repetitions need not be sent to the UE. Furthermore, as described above, the RRC early data request message may include fast release information, which may include a fast release indication or a fast release cause value to indicate that the UE is requesting a fast release to the idle or inactive mode. Accordingly, the fast release information may be included in the RRC early data request message to indicate that the UE is to be released to the idle or inactive mode as soon as possible such that the UE can resume or continue connected mode operations on the second wireless network as soon as possible.

Accordingly, as further shown in FIG. 6A, and by reference number 612, the base station in the RAN may transmit, and the UE may receive, an RRC early data complete message that includes information to release the UE to the idle or inactive mode based at least in part on the fast release information provided in the RRC early data request message. Furthermore, as shown by reference number 614, the base station in the RAN may forward the NAS paging response rejecting the paging message to the core network after transmitting the RRC early data complete message that includes information to release the UE to the idle or inactive mode.

Accordingly, the base station in the RAN generally transmits the RRC early data complete message that includes the information to release the UE to the idle or inactive mode prior to transmitting the NAS paging response to the core network in order to ensure that the UE is released to the idle or inactive mode as soon as possible. For example, in some aspects, the base station in the RAN may transmit the RRC early data complete message to release the UE to the idle or inactive mode immediately in cases where the fast release information is included in the RRC early data request message, and may subsequently forward the NAS paging response to the core network independent of the RRC early data complete message that includes the information to release the UE to the idle or inactive mode. Alternatively, in some aspects, the UE may include a timer in the RRC early data request message to indicate that the base station in the RAN is to delay transmission of the RRC early data complete message until after the timer has expired. For example, the timer may be included to provide the UE with an opportunity to evaluate conditions in the first wireless network and/or the second wireless network (e.g., in cases where the UE is engaged in a service on the second wireless network that is not time sensitive). In this case, the base station may transmit the RRC early data complete message to release the UE to the idle or inactive mode after the timer has expired, and may then transmit the NAS paging response to the core network. Additionally, or alternatively, depending on a length of the timer, the base station may transmit the NAS paging response to the core network while waiting for the timer to expire and immediately transmit the RRC early data complete message to release the UE to the idle or inactive mode upon expiration of the timer.

In general, the techniques shown in FIG. 6A may be employed in cases where the UE supports early data transmission (EDT), which generally allows one or more uplink and/or downlink transmissions to be performed (e.g., during a random access channel procedure) before an RRC connection has been fully established. In this way, the UE may transmit a single message to reject the paging message and provide the fast release information, which may reduce an amount of time that connected mode operations are disrupted on the second wireless network. However, in some cases, the UE may be a legacy UE that does not support EDT features. Accordingly, FIG. 6B illustrates another technique that the UE may employ to transmit a response rejecting the paging message in order to avoid additional paging repetitions from the first wireless network and include fast release information with the response to the paging message in order to minimize disruption to connected mode operations on the second wireless network. As described herein, the technique illustrated in FIG. 6B can be employed by any UE, including legacy UEs and UEs that support EDT features.

For example, as shown in FIG. 6B, and by reference number 620, the UE may transmit, and the base station may receive, an RRC connection request message or an RRC connection resume request message based at least in part on the paging message. As further shown in FIG. 6B, and by reference number 622, the base station in the RAN may transmit, and the UE may receive, an RRC connection setup message or an RRC connection resume message.

As further shown in FIG. 6B, and by reference number 624, the UE may transmit, and the base station in the RAN may receive, an RRC message that includes an NAS paging response and fast release information. For example, in some aspects, the NAS paging response and the fast release information may be provided in an RRC connection setup complete message, an RRC connection resume complete message, and/or the like. In some aspects, as described above, the NAS paging response may include information to indicate that the UE is rejecting the paging message (e.g., does not want to enter connected mode on the first wireless network). In this way, the UE may acknowledge that the paging message was received and indicate that additional paging repetitions need not be sent to the UE. Furthermore, as described above, the fast release information provided in the RRC connection setup complete message and/or the RRC connection resume complete message may include a fast release indication or a fast release cause value to indicate that the UE is requesting a fast release to the idle or inactive mode. Accordingly, the fast release information may be included in the RRC connection setup complete message and/or the RRC connection resume complete message to indicate that the UE is to be released to the idle or inactive mode as soon as possible, such that the UE can resume or continue connected mode operations on the second wireless network as soon as possible.

Accordingly, as further shown in FIG. 6B, and by reference number 626, the base station in the RAN may transmit, and the UE may receive, an RRC release message that includes information to release the UE to the idle or inactive mode based at least in part on the fast release information provided in the RRC connection setup complete message and/or the RRC connection resume complete message. Furthermore, as shown by reference number 628, the base station in the RAN may forward the NAS paging response rejecting the paging message to the core network after transmitting the RRC release message to the UE.

Accordingly, in the techniques shown in FIG. 6B, the base station in the RAN similarly transmits the RRC release message that includes the information to release the UE to the idle or inactive mode prior to transmitting the NAS paging response to the core network in order to ensure that the UE is released to the idle or inactive mode as soon as possible. For example, in some aspects, the base station in the RAN may transmit the RRC release message to release the UE to the idle or inactive mode immediately in cases where the fast release information is included in the RRC connection setup complete message and/or the RRC connection resume complete message, and may subsequently forward the NAS paging response to the core network independent of the RRC release message. Alternatively, in some aspects, the UE may include a timer with the fast release information to indicate that the base station in the RAN is to delay transmission of the RRC release message until after the timer has expired. For example, the timer may be included to provide the UE with an opportunity to evaluate conditions in the first wireless network and/or the second wireless network (e.g., in cases where the UE is engaged in a service on the second wireless network that is not time sensitive). In this case, the base station may transmit the RRC release message to release the UE to the idle or inactive mode after the timer has expired, and may then transmit the NAS paging response to the core network. Additionally, or alternatively, depending on a length of the timer, the base station may transmit the NAS paging response to the core network while waiting for the timer to expire and immediately transmit the RRC release message to the UE upon expiration of the timer.

As indicated above, FIGS. 6A-6B are provided as one or more examples. Other examples may differ from what is described with regard to FIGS. 6A-6B.

FIG. 7 is a diagram illustrating an example process 700 performed, for example, by a UE, in accordance with various aspects of the present disclosure. Example process 700 is an example where a UE (e.g., UE 120, and/or the like) performs operations associated with fast connection release after paging response.

As shown in FIG. 7, in some aspects, process 700 may include receiving a paging message from a base station associated with a first RAN while operating in an inactive or idle mode on the first RAN and while operating in a connected mode on a second RAN (block 710). For example, the UE may receive (e.g., using antenna 252, DEMOD 254, MIMO detector 256, receive processor 258, controller/processor 280, and/or the like) a paging message from a base station associated with a first RAN while operating in an inactive or idle mode on the first RAN and while operating in a connected mode on a second RAN, as described above.

As further shown in FIG. 7, in some aspects, process 700 may include transmitting a response rejecting the paging message to the base station associated with the first RAN, wherein the response includes information that causes the base station to release the UE to the inactive or idle mode (block 720). For example, the UE may transmit (e.g., using controller/processor 280, transmit processor 264, TX MIMO processor 266, MOD 254, antenna 252, and/or the like) a response rejecting the paging message to the base station associated with the first RAN, as described above. In some aspects, the response includes information that causes the base station to release the UE to the inactive or idle mode.

As further shown in FIG. 7, in some aspects, process 700 may include receiving, from the base station, an RRC message that includes information to release the UE to the inactive or idle mode on the first RAN (block 730). For example, the UE may receive (e.g., using antenna 252, DEMOD 254, MIMO detector 256, receive processor 258, controller/processor 280, and/or the like), from the base station, an RRC message that includes information to release the UE to the inactive or idle mode on the first RAN, as described above.

Process 700 may include additional aspects, such as any single aspect or any combination of aspects described below and/or in connection with one or more other processes described elsewhere herein.

In a first aspect, the response includes information that causes the base station to release the UE to the inactive or idle mode prior to the base station forwarding the response to a core network associated with the first RAN.

In a second aspect, alone or in combination with the first aspect, the response further includes an NAS paging response provided in an RRC early data request message, an RRC connection setup complete message, and/or an RRC resume complete message.

In a third aspect, alone or in combination with one or more of the first and second aspects, the information that causes the base station to release the UE to the inactive or idle mode includes a fast release indication and/or a fast release cause value.

In a fourth aspect, alone or in combination with one or more of the first through third aspects, the response includes a timer that causes the base station to transmit the RRC message that includes the information to release the UE to the inactive or idle mode on the first RAN after the timer has expired.

In a fifth aspect, alone or in combination with one or more of the first through fourth aspects, the RRC message that includes the information to release the UE to the inactive or idle mode on the first RAN includes an RRC early data complete message and/or an RRC release message.

In a sixth aspect, alone or in combination with one or more of the first through fifth aspects, process 700 includes resuming operation in the connected mode on the second RAN based at least in part on receiving the RRC message that includes the information to release the UE to the inactive or idle mode on the first RAN.

In a seventh aspect, alone or in combination with one or more of the first through sixth aspects, the UE includes a first SIM associated with a first subscription on the first RAN, a second SIM associated with a second subscription on the second RAN, and a set of radio and baseband components shared among the first SIM and the second SIM.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with various aspects of the present disclosure. Example process 800 is an example where the base station (e.g., base station 110 and/or the like) performs operations associated with fast connection release after paging response.

As shown in FIG. 8, in some aspects, process 800 may include transmitting a paging message to a UE operating in an inactive or idle mode on a RAN associated with the base station (block 810). For example, the base station may transmit (e.g., using controller/processor 240, transmit processor 220, TX MIMO processor 230, MOD 232, antenna 234, and/or the like) a paging message to a UE operating in an inactive or idle mode on a RAN associated with the base station, as described above.

As further shown in FIG. 8, in some aspects, process 800 may include receiving a response rejecting the paging message from the UE, wherein the response includes information requesting a release to the inactive or idle mode (block 820). For example, the base station (e.g., using transmit processor 220, receive processor 238, controller/processor 240, memory 242, and/or the like) may receive a response rejecting the paging message from the UE, as described above. In some aspects, the response includes information requesting a release to the inactive or idle mode.

As further shown in FIG. 8, in some aspects, process 800 may include transmitting, to the UE, an RRC message that includes information to release the UE to the inactive or idle mode (block 830). For example, the base station may transmit (e.g., using controller/processor 240, transmit processor 220, TX MIMO processor 230, MOD 232, antenna 234, and/or the like), to the UE, an RRC message that includes information to release the UE to the inactive or idle mode, as described above.

As further shown in FIG. 8, in some aspects, process 800 may include forwarding the response rejecting the paging message to a core network (block 840). For example, the base station may forward (e.g., using controller/processor

240, transmit processor 220, TX MIMO processor 230, MOD 232, antenna 234, and/or the like) the response rejecting the paging message to a core network, as described above.

Process 800 may include additional aspects, such as any single aspect or any combination of aspects described below and/or in connection with one or more other processes described elsewhere herein.

In a first aspect, the response rejecting the paging message is forwarded to the core network after the RRC message is transmitted to the UE.

In a second aspect, alone or in combination with the first aspect, the response further includes an NAS paging response provided in an RRC early data request message, an RRC connection setup complete message, and/or an RRC resume complete message.

In a third aspect, alone or in combination with one or more of the first and second aspects, the information requesting the release to the inactive or idle mode includes a fast release indication and/or a fast release cause value.

In a fourth aspect, alone or in combination with one or more of the first through third aspects, the RRC message that includes the information to release the UE to the inactive or idle mode is transmitted after expiration of a timer included in the response rejecting the paging message.

In a fifth aspect, alone or in combination with one or more of the first through fourth aspects, the RRC message that includes the information to release the UE to the inactive or idle mode includes an RRC early data complete message and/or an RRC release message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a paging message from a base station associated with a first radio access network (RAN) while operating in an inactive or idle mode on the first RAN and while operating in a connected mode on a second RAN;
   transmitting a response rejecting the paging message, to the base station, including information that causes the base station to release the UE to the inactive or idle mode,
   wherein the response includes a timer to indicate that the base station is to delay transmission of messaging for releasing the UE to the inactive or idle mode on the first RAN, until after the timer has expired; and
   receiving, from the base station, a radio resource control (RRC) message that includes information to release the UE to the inactive or idle mode on the first RAN.

2. The method of claim 1, wherein the response includes the information that causes the base station to release the UE to the inactive or idle mode prior to the base station forwarding the response to a core network associated with the first RAN.

3. The method of claim 1, wherein the response further includes a non-access stratum paging response provided in one or more of an RRC early data request message or an RRC connection setup complete message.

4. The method of claim 1, wherein the information that causes the base station to release the UE to the inactive or idle mode includes one or more of a fast release indication or a fast release cause value.

5. The method of claim 1, wherein the RRC message that includes the information to release the UE to the inactive or idle mode on the first RAN includes one or more of an RRC early data complete message or an RRC release message.

6. The method of claim 1, further comprising:
   resuming operation in the connected mode on the second RAN based at least in part on receiving the RRC message that includes the information to release the UE to the inactive or idle mode on the first RAN.

7. The method of claim 1, wherein the UE includes a first subscriber identity module (SIM) associated with a first subscription on the first RAN, a second SIM associated with a second subscription on the second RAN, and a set of radio and baseband components shared among the first SIM and the second SIM.

8. A method of wireless communication performed by a base station, comprising:
transmitting a paging message to a user equipment (UE) operating in an inactive or idle mode on a radio access network associated with the base station;
receiving a response rejecting the paging message from the UE including information requesting a release to the inactive or idle mode,
wherein the response includes a timer to indicate that the base station is to delay transmission of messaging for releasing the UE to the inactive or idle mode, until after the timer has expired;
transmitting, to the UE, a radio resource control (RRC) message that includes information to release the UE to the inactive or idle mode; and
forwarding the response rejecting the paging message to a core network.

9. The method of claim 8, wherein the response rejecting the paging message is forwarded to the core network after the RRC message is transmitted to the UE.

10. The method of claim 8, wherein the response further includes a non-access stratum paging response provided in one or more of an RRC early data request message, an RRC connection setup complete message, or an RRC resume complete message.

11. The method of claim 8, wherein the information requesting the release to the inactive or idle mode includes one or more of a fast release indication or a fast release cause value.

12. The method of claim 8, wherein the RRC message that includes the information to release the UE to the inactive or idle mode includes one or more of an RRC early data complete message or an RRC release message.

13. A user equipment (UE) for wireless communication, comprising:
a memory; and
one or more processors operatively coupled to the memory, the memory and the one or more processors configured to:
receive a paging message from a base station associated with a first radio access network (RAN) while operating in an inactive or idle mode on the first RAN and while operating in a connected mode on a second RAN;
transmit a response rejecting the paging message, to the base station, including information that causes the base station to release the UE to the inactive or idle mode,
wherein the response includes a timer to indicate that the base station is to delay transmission of messaging for releasing the UE to the inactive or idle mode on the first RAN, until after the timer has expired; and
receive, from the base station, a radio resource control message that includes information to release the UE to the inactive or idle mode on the first RAN.

14. A base station for wireless communication, comprising:
a memory; and
one or more processors operatively coupled to the memory, the memory and the one or more processors configured to:
transmit a paging message to a user equipment (UE) operating in an inactive or idle mode on a radio access network associated with the base station;
receive a response rejecting the paging message from the UE including information requesting a release to the inactive or idle mode,
wherein the response includes a timer to indicate that the base station is to delay transmission of messaging for releasing the UE to the inactive or idle mode, until after the timer has expired;
transmit, to the UE, a radio resource control message that includes information to release the UE to the inactive or idle mode; and
forward the response rejecting the paging message to a core network.

15. The UE of claim 13, wherein the response further includes a non-access stratum paging response provided in one or more of an RRC early data request message, an RRC connection setup complete message, or an RRC resume complete message.

16. The UE of claim 13, wherein the information that causes the base station to release the UE to the inactive or idle mode includes one or more of a fast release indication or a fast release cause value.

17. The UE of claim 13, wherein the RRC message that includes the information to release the UE to the inactive or idle mode on the first RAN includes one or more of an RRC early data complete message or an RRC release message.

18. The UE of claim 13, wherein the one or more processors are further configured to:
resume operation in the connected mode on the second RAN based at least in part on receiving the RRC message that includes the information to release the UE to the inactive or idle mode on the first RAN.

19. The method of claim 1, further comprising:
wherein the timer is configured to provide the UE with time to evaluate conditions in one or more of the first RAN or the second RAN during.

20. The UE of claim 13, wherein the timer is configured to provide the UE with time to evaluate conditions in one or more of the first RAN or the second RAN during.

* * * * *